(12) United States Patent
Lam et al.

(10) Patent No.: US 11,059,246 B2
(45) Date of Patent: Jul. 13, 2021

(54) TIRE REPAIRING SYSTEM

(71) Applicant: Active Tools International (HK) Ltd., Causeway Bay (HK)

(72) Inventors: Kong Fung Lam, Causeway Bay (HK); Wai Kwong Ching, Causeway Bay (HK)

(73) Assignee: Active Tools International (HK) Ltd., Causeway Bay (HK)

( * ) Notice: Subject to any disclaimer, the term of this patent is extended or adjusted under 35 U.S.C. 154(b) by 0 days.

(21) Appl. No.: 16/650,117

(22) PCT Filed: Sep. 25, 2017

(86) PCT No.: PCT/CN2017/103143
§ 371 (c)(1),
(2) Date: Mar. 24, 2020

(87) PCT Pub. No.: WO2019/056357
PCT Pub. Date: Mar. 28, 2019

(65) Prior Publication Data
US 2020/0307129 A1 Oct. 1, 2020

(51) Int. Cl.
*B29C 73/02* (2006.01)
(52) U.S. Cl.
CPC ................... *B29C 73/025* (2013.01)
(58) Field of Classification Search
CPC .............................. B29C 73/166; B29C 73/025
USPC ............................................................ 141/38
See application file for complete search history.

(56) References Cited

U.S. PATENT DOCUMENTS

| | | | |
|---|---|---|---|
| 7,798,183 B2* | 9/2010 | Cegelski | B29C 73/166 141/38 |
| 8,245,737 B2* | 8/2012 | Stehle | B60C 29/062 141/38 |
| 8,631,840 B2 | 1/2014 | Lolli et al. | |
| 9,168,798 B2 | 10/2015 | Eckhardt | |
| 2009/0218005 A1 | 9/2009 | Stehle | |

(Continued)

FOREIGN PATENT DOCUMENTS

| | | |
|---|---|---|
| CN | 101312821 A | 11/2008 |
| EP | 1 463 626 B1 | 12/2007 |
| EP | 2 422 960 A1 | 2/2012 |

(Continued)

OTHER PUBLICATIONS

Patent Cooperation Treaty, International Search Report and Written Opinion of the International Searching Authority dated Jun. 22, 2018 for International Application No. PCT/CN2017/103143, 10 pages.

(Continued)

*Primary Examiner* — Jason K Niesz
(74) *Attorney, Agent, or Firm* — Fitch, Even, Tabin & Flannery, LLP

(57) ABSTRACT

The present application relates to a tire repairing system, comprising: an inflation device including an inflation housing and a motor; and a sealant container having a container housing, an air outlet of the inflation device can be connected to an air inlet of the sealant container, wherein the inflation housing is able to connect to the container housing in such a way that the container housing acts as a pedestal and the inflation housing is arranged on the container housing.

18 Claims, 7 Drawing Sheets

(56) References Cited

U.S. PATENT DOCUMENTS

2016/0136906 A1   5/2016  Chou
2018/0244002 A1   8/2018  Sekiguchi

FOREIGN PATENT DOCUMENTS

| JP | 2012-111052 A | 6/2012 |
| JP | 2016-155248 A | 9/2016 |
| KR | 2013-0069607 A | 6/2013 |
| KR | 2014-0005870 A | 1/2014 |
| WO | 2010/006771 A1 | 1/2010 |
| WO | 2011/109176 A2 | 9/2011 |
| WO | 2011/109176 A3 | 12/2011 |

OTHER PUBLICATIONS

European Patent Office, Extended European Search Report for European Patent Application No. 17925772.0 dated Apr. 29, 2021, 8 pages.

* cited by examiner

TIRE REPAIRING SYSTEM

CROSS-REFERENCE TO RELATED APPLICATIONS

This application is a U.S. national phase application filed under 35 U.S.C. § 371 of International Application Number PCT/CN2017/103143, filed Sep. 25, 2017, designating the United States.

TECHNICAL FIELD

The present application relates to a tire repairing system for repairing a tire. In particular, the present application relates to a tire repairing system having an inflation device and a sealant container.

BACKGROUND OF THE INVENTION

In the devices using a tire, such as vehicles, tire leakage or tire penetration will occur to the tire. Various tire repairing systems, comprising an inflation device and a sealant container, are available in the market to deal with the tire problems raised during the operation of the devices. For example, when a tire leakage is happened during the drive of a vehicle, the driver may use the tire repairing system to repair the tire on site.

Generally, when the tire is punched, the outlet end of the sealant container is connected to the tire, the inlet end of the sealant container is connected to the inflation device. Then, the inflation device is activated to generate compressed air, which compressed air pushes the sealant to flow from the sealant container into the tire. The sealant will repair the tire and compressed air is filled in the tire. Thus, the vehicle can continue its operation.

The inflation device and the sealant container generally are independent or dependent components so that they can be easily carried and stored. During the operation, the sealant container will place next to the inflation device. A flexible tube is used to connect the sealant container to the inflation device, another flexible tube is used to connect the sealant container to the tire. The inflation device is activated to deliver the sealant into the tire. The pressure will be fluctuated during the operation and may cause the sealant container and/or the inflation device to tremble or jump, which will produce noise and may lead to the leakage or failure of the connections thereof. Therefore, a user may need to additionally secure the sealant container, for example, the user may press the sealant container by hand.

Another solution is to increase the weight of the inflation device and the sealant container. However, it would add weight to the repairing system and be detrimental to the portability of the repairing system.

Therefore, it is necessary to provide an improved tire repairing system to avoid the trembling. The improved tire repairing system provided by the present application is convenience for use and eliminates the trembling of the sealant container and/or the inflation device and prevents the failure or leakage of the connection between the sealant container and the inflation device or the tire.

SUMMARY OF THE INVENTION

In one embodiment, the present application provides a tire repairing system, comprising: an inflation device (10) including an inflation housing (11) and a motor; and a sealant container (20) having a container housing (21), the sealant container (20) is independent or dependent to the inflation device (10), an air outlet (13) of the inflation device (10) can be connected to an air inlet (23) of the sealant container (20), wherein the inflation housing (11) is able to connect to the container housing (21) in such a way that the container housing (21) acts as a pedestal and the inflation housing (11) is arranged on the container housing (21).

Since the container housing is used as a pedestal, the weight of the inflation device acts on the container housing, which would assist in preventing the trembling of the sealant container. The present repairing system is more stable in operation since the weight of the inflation device and the weight of the sealant container are sufficiently utilized. Thus, a trembling or jumping of the sealant container would be avoided or substantially alleviated.

In another embodiment, the inflation housing (11) includes a first connecting means on its bottom surface (15), the container housing (21) includes a corresponding second connecting means, the inflation housing (11) is coupled to the container housing by engaging the first connecting means and the second connecting means.

In another embodiment, the air inlet (23) is connected to the air outlet (13) by a tube.

In another embodiment, the air inlet (23) is directly coupled to the air outlet (13).

In another embodiment, the first connecting means is at least one recess (14) and the second connecting means is at least one protrusion (24), or the first connecting means is at least one protrusion and the second connecting means is at least one recess.

In another embodiment, the recess (14) includes a substantially circular portion and an elongated portion, a diameter of the substantially circular portion is larger than a width of the elongated portion, the protrusion (24) includes an upper portion having a first diameter and a lower portion having a second diameter smaller than the first diameter, the first diameter is less than the diameter of the substantially circular portion.

In another embodiment, the recess is a trapezoid recess (31) formed in the bottom surface (15), the trapezoid recess (31) extends through at least a portion of the inflation housing, the protrusion is shaped to correspond to the trapezoid recess (31).

In another embodiment, the air outlet (13) is provided in the trapezoid recess (31), the air inlet (23) is provided on the protrusion, such that the air outlet (13) forms a tight seal connection with the air inlet (23) when the protrusion is slidably inserted into the trapezoid recess (31) to an engagement position.

In another embodiment, the first connecting means and the second connecting means form a kick-lock connection.

In another embodiment, a locking device is provided to selectively lock or unlock the inflation device and the sealant container.

In another embodiment, the locking device includes an actuating means for unlocking the inflation device and the sealant container.

In another embodiment, the inflation housing includes at least one auxiliary support means at its side surface or bottom surface.

In another embodiment, the auxiliary support means is a telescopic rod.

In another embodiment, an actuating mechanism is provided to control the extension and retraction of the telescopic rod.

In another embodiment, the telescopic rod extends outwardly and at an angle of 0-45 degrees to a vertical axis perpendicular to the bottom surface.

In another embodiment, the first connecting means is a threaded recess and the second connecting means is a screw bolt.

In another embodiment, the first connecting means includes the air outlet and the second connecting includes the air inlet, wherein the air inlet is directly coupled to the air outlet.

In another embodiment, the inflation housing includes an air outlet on its bottom surface and the container housing includes an air inlet on its upper surface, the air outlet can directly couple to the air inlet.

In another embodiment, wherein the inflation device includes automatic pressure relief valve.

THE BRIEF DESCRIPTION OF THE DRAWINGS

DETAILED EMBODIMENTS

The following will describe some embodiments of the present application in combination with the drawings. The detailed embodiments should not be regarded as a limitation to the present application, but only aim to explain the concept of the present application.

Figure 1:
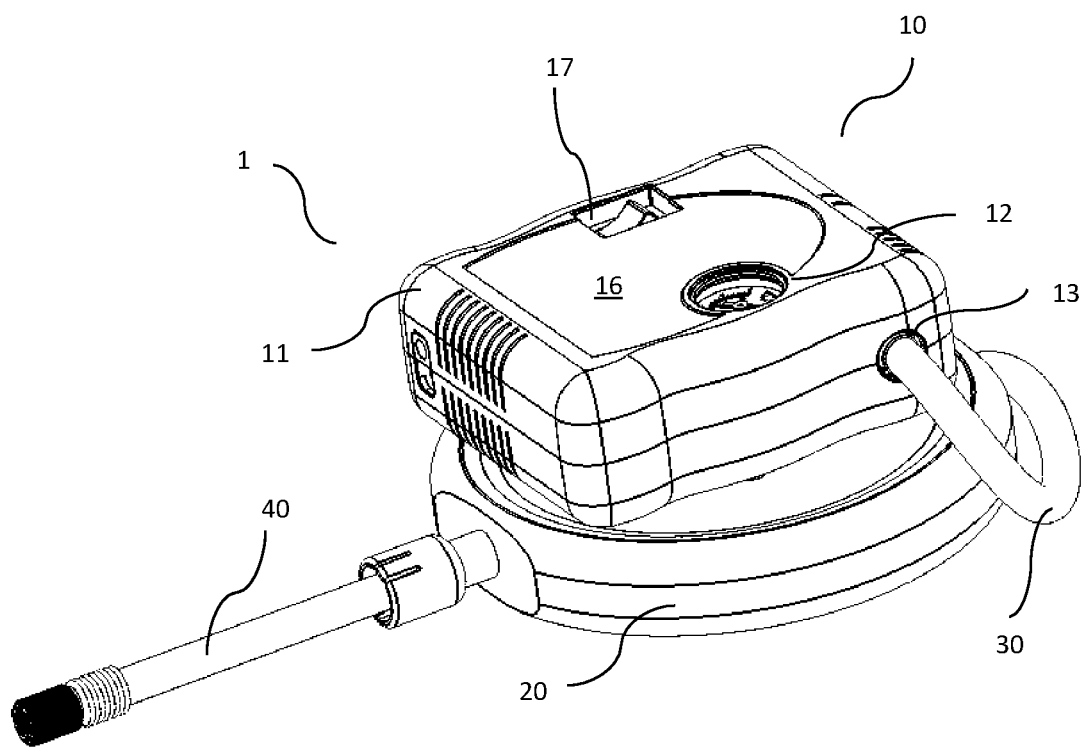
FIG. 1 shows an embodiment of the present tire repairing system, wherein the inflation device and the sealant container are coupled together.

FIG. 1 shows an embodiment of the present invention, wherein the tire repairing system comprises an inflation device 10 and a sealant container 20. An air outlet 13 of the inflation device 10 is connected to an air inlet 23 of the sealant container 20. The inflation device 10 and the sealant container 20 are in a coupled state as shown in FIG. 1, the inflation device 10 is placed on the sealant container 20 which in turn is placed on a supporting surface, e.g. the ground. The inflation device 10 comprises an inflation housing 11 in which a driven means is provided. The driven means can be an electrical motor for driving a piston through transmission in a reciprocated manner within a cylinder to generate compressed air. Optionally, a pressure gauge 12 can be provided on the inflation housing 11, for indicating the output pressure of the compressed air, which output pressure substantially equals to the inner pressure of the tire. The inflation device will be switched off to finish the repairing procedure when the output pressure reaches approximately the normal pressure or nominal pressure of a tire. The normal pressure or nominal pressure of a tire can be determined by the manufacturer based on the tire type or usage of the tire.

For a portable tire repairing system, the inflation device can be driven by an output power of a vehicle. It should be understood that using other power source to drive the inflation device is also within the scope of the present application. A switch 17 can be provided to control the on-off of the inflation device 10. Other components known in the art can be included in the inflation device 10. The output tube 40 of the repairing system is used to connect to a tire for delivering the compressed air and the sealant to the tire. The inflation device can cooperate with sealant containers having different volume.

Figure 2:
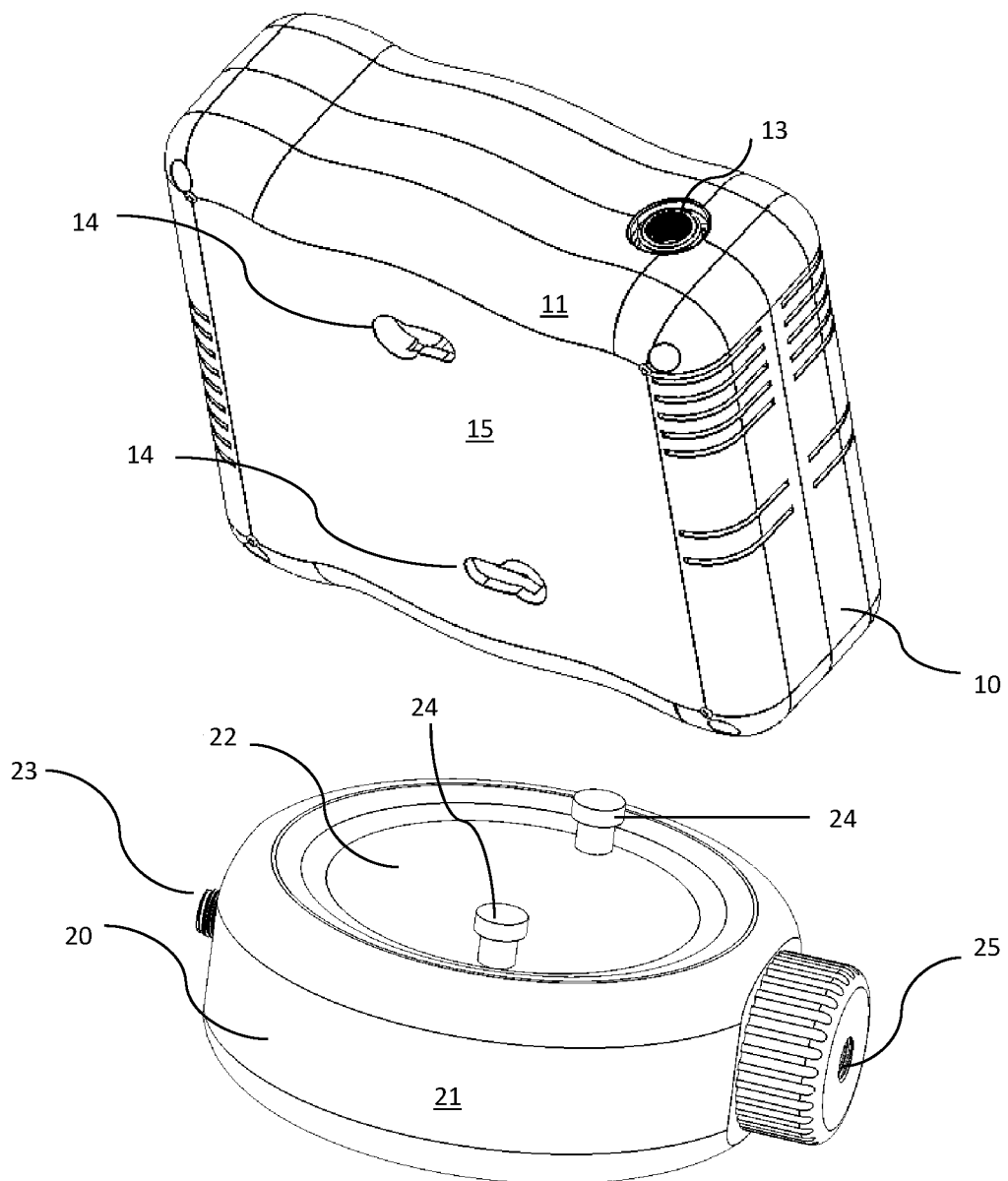
FIG. 2 shows the inflation device and the sealant container are in a separated condition such that one embodiment of the connection means there between is clearly shown.

FIG. 1 shows an inflation housing 11 in a shape of a substantial cuboid, having an upper surface 16 and a bottom surface 15 (FIG. 2). It can be appreciated that the inflation housing can have other shapes.

The inflation device 10 and the sealant container 20 shown in FIG. 2 are in a separated state, so that an embodiment of the connecting means between the inflation device 10 and the sealant container 20 is clearly shown. The inflation device 10 includes a first connecting means and the sealant container 2o has a corresponding second connecting means. The first connecting means and the second connecting means can cooperate with each other to couple the inflation device 10 and the sealant container 20 together.

In one embodiment, the first connecting means of the inflation device 10 is at least one recess 14 arranged in the bottom surface 15. FIG. 2 shows two recesses 14. The recesses 14 is able to accommodate the corresponding protrusions 24. The recess 14 includes a substantially circular portion and an elongated portion whose width is smaller than the diameter of the substantially circular portion.

The sealant container 20 includes a container housing 21. The bottom surface of the container housing 21 is sustainably planar so that the sealant container can station on the supporting surface, e.g. the ground. Alternatively, a plurality of support legs can be provided on the bottom surface of the container housing. FIG. 2 shows the container housing having an oblate cylindrical shape which has a large diameter and a small height. One skilled in the art would understand that the container housing can be in other suitable shapes, for example, a cuboid. In one embodiment, the container housing can have a cross section of trapezoid with its upper portion being narrower than its lower portion. The container housing 21 includes an air inlet 23 and a sealant outlet 25. The air inlet 23 can be connected to the air outlet 13 of the inflation device 10, for example via a tube. A check valve preferably is provided in the sealant outlet 25 such that the sealant can only flow out from the sealant outlet and back flow is prevented.

The container housing 21 includes a substantially planar upper surface 22. A second connecting means of the sealant container is at least one protrusion provided on the upper surface 22. The protrusions 24 comprise an upper portion having a first diameter and a lower portion having a second diameter which is less than the first diameter. The first diameter is slightly smaller than the substantially circular portion of the recess 14 such that the upper portion can be inserted into the substantially circular portion. A width of the elongated portion of the recess 14 is smaller than the first diameter. The second diameter is slightly less or equals to the width of the elongated portion. Thus, the upper portion of the protrusion 24 can be inserted into the substantially circular portion, then the lower portion of the protrusion 24 slides along the elongated portion and into a locking position, such that the protrusion 24 and the recess 14 are coupled together. Since the upper portion is larger than the elongated portion of the recess, the protrusion 24 can not be disengaged from the recess at the locking position. In order to uncouple the protrusion from the recess, it is necessary to slide the protrusion in a reversed direction from the locking portion along the elongated portion to the substantially circular portion, such that the protrusion can be detached from the recess 14.

FIG. 2 shows two recesses 14 arranged in reversed directions, in other words, the direction of the substantially circular portion and the elongated portion is different. When the protrusion is inserted into the recess 14, the inflation housing 11 is rotated with respect to the container housing 21, whereby the protrusion 24 enters into a locking position in the recess so that the protrusion 24 and the recess 14 are locked together. The inflation device and the sealant container thus are coupled and locked together. In order to detach the inflation housing from the sealing housing, the inflation housing 11 rotates in a reversed direction such that the recess 14 disengages from the protrusion 24.

Alternatively, the two recesses 14 can be arranged in the same direction. When the protrusion is inserted into the recess 14, the inflation housing 11 is slid with respect to the container housing 21, whereby the protrusion 24 enters into a locking position in the recess so that the protrusion 24 and the recess 14 are locked together. The protrusion 24 and the recess 14 can be unlocked and disengaged by the reversed movement of the inflation housing 11.

One skilled in the art would understand that, though protrusions and recesses are used as an example, other kick-lock connections or suitable connections are applicable to realize the engagement of the inflation device and the sealant container.

Preferably, the bottom surface 15 of the inflation housing 11 and the upper surface 22 of the container housing 21 are in corresponding shapes. In the embodiment of FIG. 2, the bottom surface 15 and the upper surface 22 are substantially planar. In another embodiment, the bottom surface 15 can be in a concave shape and the upper surface 22 can be in a corresponding convex shape.

Although the air outlet 13 of the inflation device is provided in the side wall of the inflation housing in FIG. 2 and the air inlet 23 of the sealant container is provided in the side wall of the container housing, it is understood that the air outlet 13 and the air inlet 23 can be provided in other locations. For example, the air outlet 13 of the inflation device may be provided on the bottom surface 15, and the air inlet 23 of the sealant container may be provided on the upper surface 22. The air outlet 13 and the air inlet 23 are arranged so that the air outlet 13 and the air inlet 23 form a sealed connection after the connection means are engaged with each other, so that the tube can be omitted.

For example, the air outlet 13 of the inflation device may be formed as a port extending from the bottom surface 15, and the air inlet 23 of the sealant container may be formed as a mating recess on the upper surface 22. When the inflation device and the sealant container are engaged, the port is inserted into the recess to form a sealed connection. It will be appreciated that the ports and recesses may be provided with annular seals to assist in forming a sealed connection. When the inflation device is actuated, the compressed air from the inflation device can enter the sealant container to deliver the sealant into the tire. After tire repairing is completed, the inflation device and the sealant container are disengaged, so that the port is also disengaged from the notch.

Figure 3:
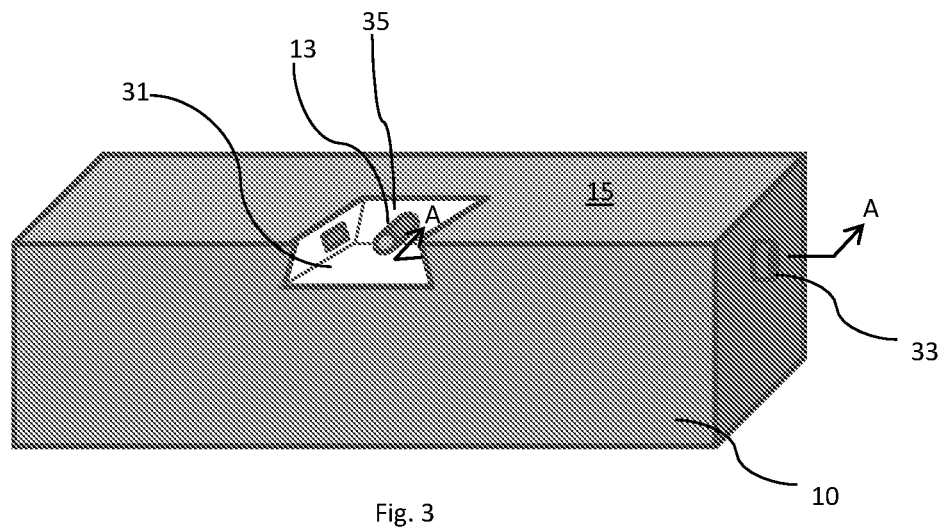
FIG. 3 shows another embodiment of the connection means on the inflation device, the sealant container includes a corresponding connection feature.

FIG. 3 shows a schematic view of an inflation housing, showing another embodiment of a connection device. For ease of description, the bottom surface 15 of the inflation housing is showing upwards. In the bottom surface, a groove 31 having a trapezoidal cross section is provided. As shown in the figure, the trapezoid is narrower at the upper portion and wider at the lower portion. The groove extends through a portion of the inflation housing. It will be appreciated that the groove 31 may also extend completely through the inflation housing.

The upper surface of the sealant container is provided with a corresponding projection having a corresponding trapezoidal cross-section so that the projection can slide into the groove 31 to lock the inflation housing and the container housing. It will be appreciated that, alternatively, the groove is provided on the container housing and the projection is provided on the inflation housing.

In one embodiment, the air outlet 13 of the inflation device may be provided on the end wall 35 of the groove and the air inlet of the sealant container may be provided on the corresponding end wall of the protrusion. Thus, the air outlet of the inflation device can be in sealing engagement with the air inlet of the sealant container when the projection is slid into the groove 31 into a locked position.

Figure 4:
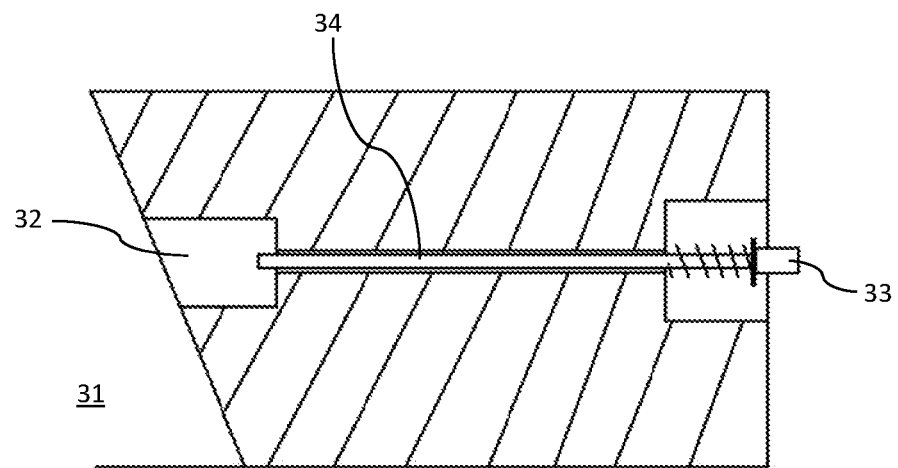
FIG. 4 is a partial sectional view of FIG. 3, shows an example of the locking device.

Preferably, a locking device may be provided to lock the projection and groove and in turn lock the inflation device and the sealant container. For example, as shown in FIG. 4, a sidewall of the groove 31 is provided with a recess 32. As shown in FIG. 4, a corresponding spring-loaded pin is provided in the side wall of the protrusion, so that when the projection and the groove slide into the mating position, the spring-loaded pin engages the recess 32 under the action of the spring. Thus, the projection and the grove are locked, which in turn locks the inflation device and the sealant container.

A release device may be provided on the side wall of the inflation device, for example, a button 33. The button 33 is connected to an actuating lever 34, and the actuating lever 34 slidably extends to the recess 32. In order to unlock the protrusion and the groove, the button 33 is pressed so that the actuating lever 34 pushes the spring-loaded pin out of the recess 32. As such, the inflation device can slide with respect to the sealant container to detach the inflation device from the sealant container.

Figure 5:
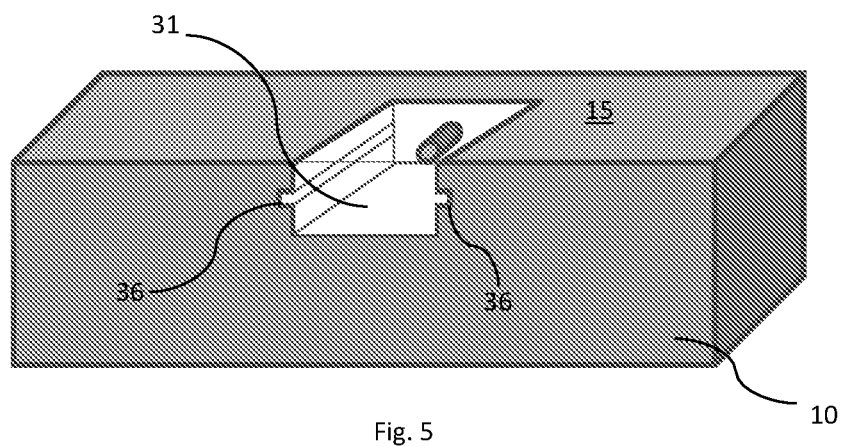
FIG. 5 shows another embodiment of the connection means on the inflation device, the sealant container includes a corresponding connection feature.

In another example, the cross-sections of the groove and projection may be in a substantially rectangular shape, and cooperating small grooves and small convex portions may be provided on the side walls so that the inflation housing and the container housing can also be coupled to each other. As shown in FIG. 5, the groove 31 is provided with small grooves 36 on one or both sides thereof. The projection is provided with cooperating small convex portion (not shown), such that the projection can slide into a locked position along the groove.

In the tire repairing system of the present invention, since the inflation device is mounted on the sealant container, the weight of the inflation device is directly applied to the sealant container, thereby increasing the stability of the sealant container and substantially avoiding the trembling of the sealant container during operation. Moreover, in some embodiments, the use of flexible tubes is also avoided, making the tire repair system more simplified.

Figure 6:
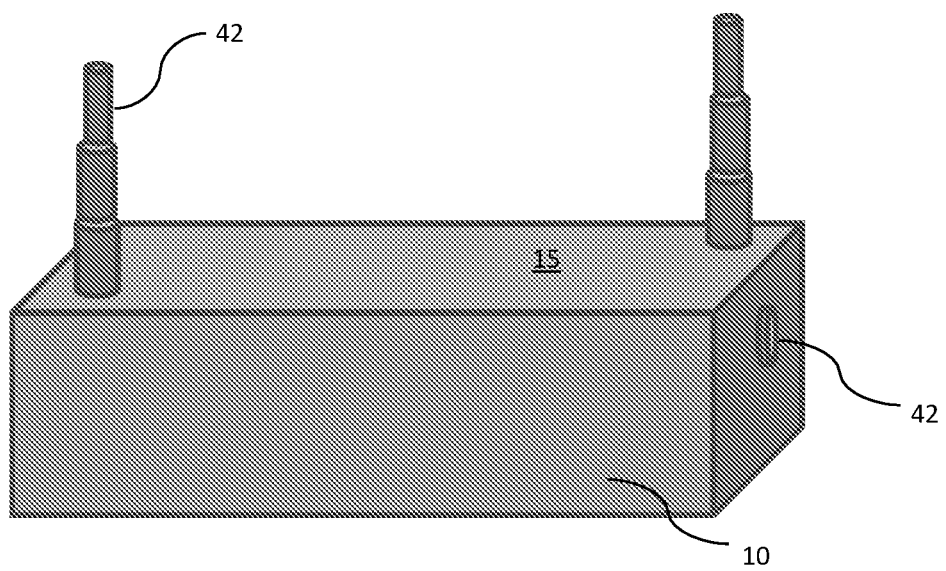
FIG. 6 shows an embodiment of the auxiliary support means of the inflation device.

In one embodiment, the inflation housing is also provided with auxiliary support means at the vicinity of at least one corner, as shown in FIG. 6. The connection means are omitted in FIG. 6 to highlight the auxiliary support means. FIG. 6 shows two auxiliary support means 41 provided on the bottom surface 15. For example, the auxiliary support means 41 is a telescopic rod. The telescopic rod has a storage position and an extended position. The telescopic rod is retracted into the inflation housing in the storage position, thereby providing a substantially flat surface. In the extended position, the telescopic rod extends into contact with the support surface, such as the ground. The telescopic rod at the extended position preferably extends outwardly, for example at an angle of 0-45 degrees to a vertical axis perpendicular to the bottom surface 15. An actuating mechanism, such as a key 42, may be provided to control the extension and retraction of the telescopic rod. The key can also control the extension length of the telescopic rod.

Figure 7:
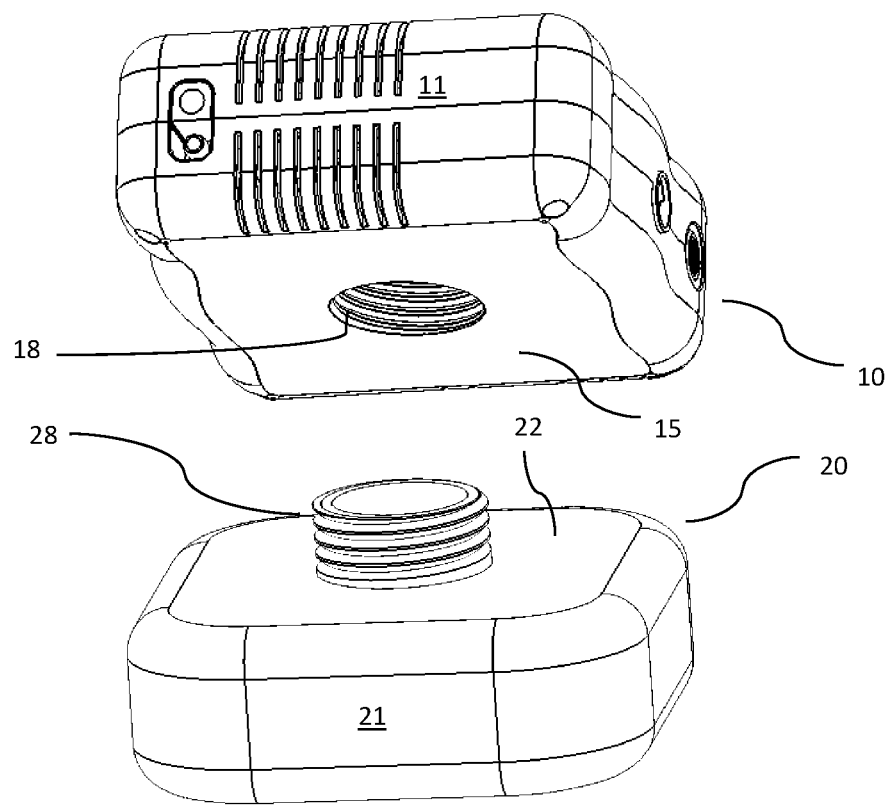
FIG. 7 shows another embodiment for the connections means between the sealant container and the inflation device.

FIG. 7 shows another embodiment of the connecting means between the sealant container and the inflation device. The first connecting means on the bottom surface 15 is in the form of a threaded recess 18. The second connecting means on the upper surface 22 is in the form of a screw bolt 28 which can be threadedly engaged with the threaded recess. Therefore, the sealant container and the inflation device can be coupled to each other by thread connection. For the sake of clarity, the air inlet and sealant outlet of the sealant container are omitted from FIG. 7.

Figure 8A:
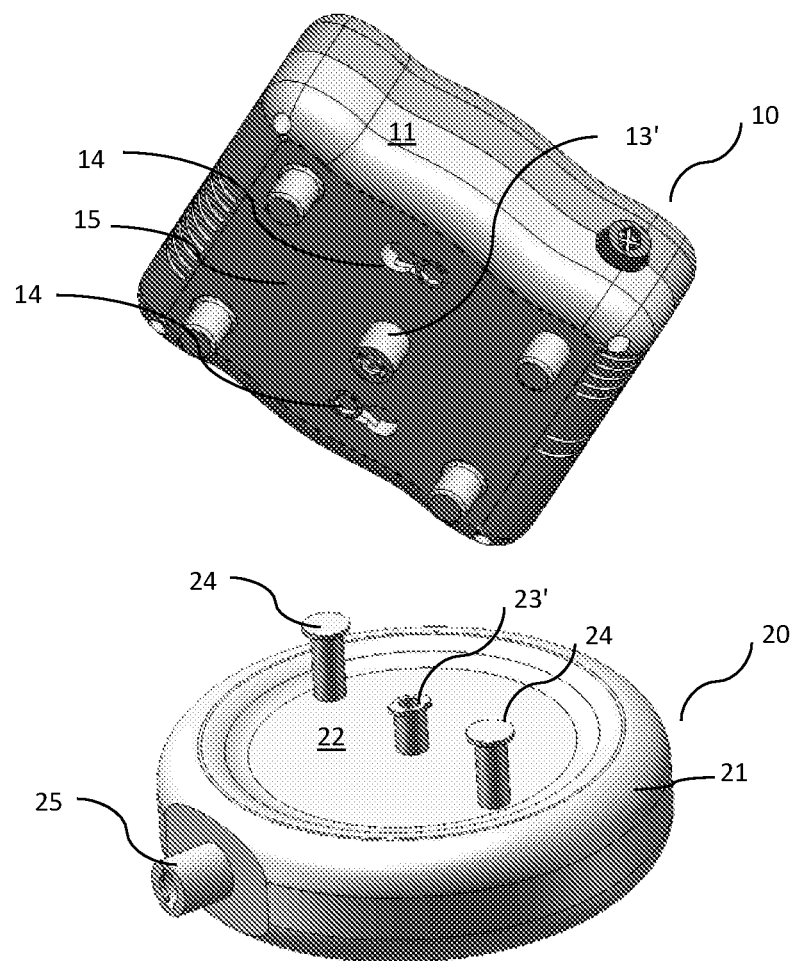
FIGS. 8A-8B show another embodiment of the present application.
Figure 8B:
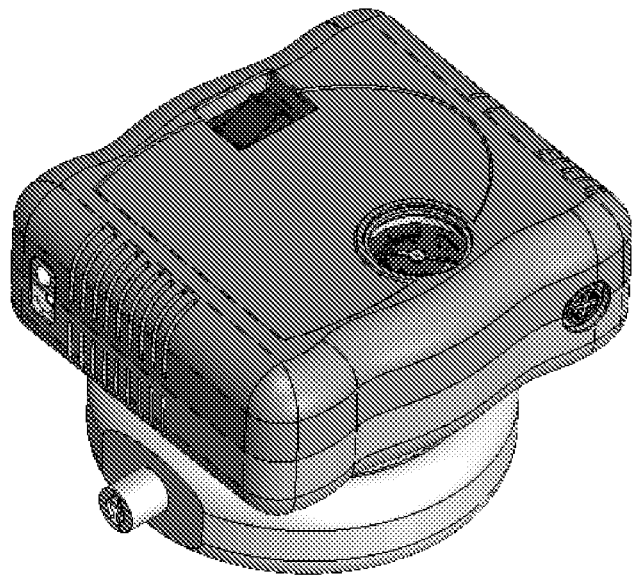

A further embodiment of the present application is shown in FIGS. 8A-8B. This embodiment is similar to FIG. 2 except that an air outlet 13' is provided on the bottom surface 15 and an air inlet 23' is provided on the upper surface 22. The sealant container 20 has an oblate cylindrical shape which has a large diameter and a small height. Upon the engagement of the sealant container 20 and the inflation device 10, the air inlet 23' is inserted into the air outlet 13' in an air tight manner. Thus, the inflation device 10 can pump air into the sealant container 20 to pump the sealant out through the sealant outlet 25. FIG. 8B shows an assembled state where the sealant container 20 is engaged with the inflation device 10.

In some circumstance, the air outlet 13' can act as the first connecting means and the air inlet 13' can act as the second connecting means. In this connection, the recess 14 and the protrusion 24 can be omitted.

Figure 9:
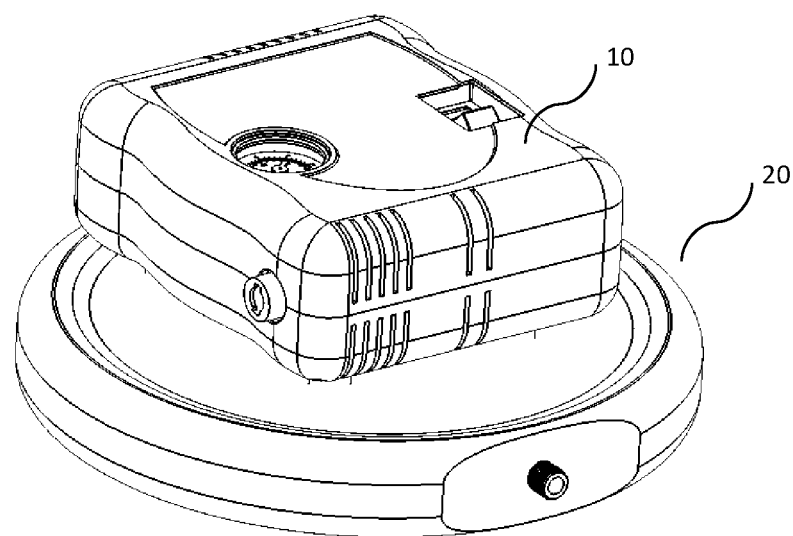
FIG. 9 shows another embodiment of the present application.

FIG. 9 shows a sealant container 10 which has a bigger size than the inflation device 20.

Inflation devices can be used with various sizes of sealant containers. If the size of the inflation housing is greater than the size of the container housing, e.g., the inflation housing extends beyond the container housing, the auxiliary support means may extend to contact the support surface so that further auxiliary support may be provided for the tire repair system. It can be envisaged that the auxiliary support means can be provided on the side wall of the inflation housing, and the auxiliary support means may extend obliquely downwardly to contact the support surface.

The inflation device may include automatic pressure relief valve for safety, such that the pressure will automatically be released when the pressure within the inflation device is beyond a threshold.

While the above detailed description has shown, described, and pointed out novel features as applied to various embodiments, it will be understood that various omissions, substitutions, and changes in the form and details of the device or process illustrated may be made without departing from the spirit of the disclosure. Additionally, the various features and processes described above may be used independently of one another, or may be combined in various ways. All possible combinations and subcombinations are intended to fall within the scope of this disclosure. Many of the embodiments described above include similar components, and as such, these similar components can be interchanged in different embodiments.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein.

The invention claimed is:

1. A tire repairing system, comprising:
an inflation device including an inflation housing and a motor; and
a sealant container having a container housing, an air outlet of the inflation device can be connected to an air inlet of the sealant container, wherein the inflation housing is able to connect to the container housing in such a way that the container housing acts as a pedestal and the inflation housing is arranged on the container housing, wherein the inflation housing includes at least one auxiliary support means at its side surface or bottom surface.

2. A tire repairing system as claimed in claim 1, wherein the inflation housing includes an air outlet on its bottom surface and the container housing includes an air inlet on its upper surface, the air outlet can directly couple to the air inlet.

3. A tire repairing system as claimed in claim 1, wherein the inflation device includes an automatic pressure relief valve.

4. A tire repairing system as claimed in claim 1, wherein a locking device is provided to selectively lock or unlock the inflation device and the sealant container.

5. A tire repairing system as claimed in claim 4, wherein the locking device includes an actuating means for unlocking the inflation device and the sealant container.

6. A tire repairing system as claimed in claim 1, wherein the auxiliary support means is a telescopic rod.

7. A tire repairing system as claimed in claim 6, wherein an actuating mechanism is provided to control the extension and retraction of the telescopic rod.

8. A tire repairing system as claimed in claim 6, wherein the telescopic rod extends outwardly and at an angle of 0-45 degrees to a vertical axis perpendicular to the bottom surface.

9. A tire repairing system as claimed in claim 1, wherein the inflation housing includes a first connecting means on its bottom surface, the container housing includes a corresponding second connecting means, the inflation housing is coupled to the container housing by engaging the first connecting means and the second connecting means.

10. A tire repairing system as claimed in claim 9, wherein the air inlet is connected to the air outlet by a tube.

11. A tire repairing system as claimed in claim 9, wherein the air inlet is directly coupled to the air outlet.

12. A tire repairing system as claimed in claim 9, wherein the first connecting means and the second connecting means form a kick-lock connection.

13. A tire repairing system as claimed in claim 9, wherein the first connecting means is a threaded recess and the second connecting means is a screw bolt.

14. A tire repairing system as claimed in claim 9, wherein the first connecting means includes the air outlet and the second connecting means includes the air inlet, wherein the air inlet is directly coupled to the air outlet.

15. A tire repairing system as claimed in claim 9, wherein the first connecting means is at least one recess and the second connecting means is at least one protrusion, or the first connecting means is at least one protrusion and the second connecting means is at least one recess.

16. A tire repairing system as claimed in claim 15, wherein the recess includes a substantially circular portion and an elongated portion, a diameter of the substantially circular portion is larger than a width of the elongated portion, the protrusion includes an upper portion having a first diameter and a lower portion having a second diameter smaller than the first diameter, the first diameter is less than the diameter of the substantially circular portion.

17. A tire repairing system as claimed in claim 15, wherein the recess is a trapezoid recess formed in the bottom surface, the trapezoid recess extends through at least a portion of the inflation housing, the protrusion is shaped to correspond to the trapezoid recess.

18. A tire repairing system as claimed in claim 17, wherein the air outlet is provided in the trapezoid recess, the air inlet is provided on the protrusion, such that the air outlet forms a tight seal connection with the air inlet when the protrusion is slidably inserted into the trapezoid recess to an engagement position.

\* \* \* \* \*